(12) United States Patent
Green et al.

(10) Patent No.: US 6,503,403 B2
(45) Date of Patent: Jan. 7, 2003

(54) GAS-LIQUID CONTACT APPARATUS

(76) Inventors: Lawrence M. Green, 9740 SW. 72$^{nd}$ Ct., Miami, FL (US) 33156; Michael G. Nickelsen, 1993 NW. 178$^{th}$ Way, Pembroke Pines, FL (US) 33029

( * ) Notice: Subject to any disclaimer, the term of this patent is extended or adjusted under 35 U.S.C. 154(b) by 91 days.

(21) Appl. No.: 09/820,136

(22) Filed: Mar. 28, 2001

(65) Prior Publication Data

US 2002/0139755 A1 Oct. 3, 2002

(51) Int. Cl.$^7$ .................................................. C02F 1/00
(52) U.S. Cl. ...................... 210/748; 210/750; 210/760; 210/194; 210/198.1; 261/74; 261/75
(58) Field of Search ................................. 210/748, 750, 210/760, 194, 198.1; 261/74, 75

(56) References Cited

U.S. PATENT DOCUMENTS

| | | | |
|---|---|---|---|
| 4,072,613 A | 2/1978 | Alig ........................ | 210/198 R |
| 4,162,970 A | 7/1979 | Zlokarnik ..................... | 210/15 |
| 4,581,137 A | 4/1986 | Edwards et al. ............ | 210/220 |
| 5,314,076 A | 5/1994 | La Place et al. ............ | 210/205 |
| 5,399,261 A | 3/1995 | Martin et al. ............ | 210/195.1 |
| 5,720,905 A | 2/1998 | Ho .............................. | 261/16 |
| 6,074,564 A | * 6/2000 | Foellmi | |
| 6,139,755 A | 10/2000 | Marte et al. ................ | 210/752 |
| 6,279,177 B1 | * 8/2001 | Gloodt | |
| 6,332,980 B1 | * 12/2001 | Moorehead | |

* cited by examiner

Primary Examiner—Betsey Morrison Hoey
(74) Attorney, Agent, or Firm—David L. Garrison; Garrison & Assoc. PS

(57) ABSTRACT

An apparatus and method for enhancing dissolution of gases in liquids by ejecting the gas-liquid mixture through nozzles in a reaction vessel. The nozzles are pressurized, sized and directed to produce micro-fine gas bubbles in the liquid and to initiate rotational flow of the gas-liquid mixture in the reaction vessel. The small bubble size and rotational flow maximizes the time the gas is in contact with the liquid. The apparatus and method are used to increase the dissolution of ozone gas into aqueous solutions to increase the decomposition of aqueous-based organic compounds, precipitation of heavy metals, and destruct and/or deactivate enteric viruses, enteric bacteria, and protozoans. An alternative embodiment mixes the gas with the liquid prior to ejection through the nozzles.

29 Claims, 3 Drawing Sheets

GAS-LIQUID CONTACT APPARATUS

CROSS REFERENCE TO RELATED INVENTIONS

This application related to U.S. Pat. No. s 6,096,219 and 5,811,014 by the same inventors, which patents are both incorporated herein by reference. No priority is claimed based upon those patents.

BACKGROUND

1. Field of Invention

The invention relates to methods and apparatus for increasing the contact efficiency between a fluid and a liquid by a) inducing rotational movement in the liquid, and b) injecting very fine fluid bubbles into the liquid.

The method and apparatus can be applied to many fields, including purification of liquids and treatment of contaminated liquids by dissolving ozone into the liquid. The invention can also be used to treat any type of liquid with any type of fluid.

2. Description of Related Art

Establishing and maintaining efficient gas-liquid contact is essential for efficient mass transfer or absorption of a gas into a liquid. The gas can be diffused for many purposes, including purification and treatment of contaminated liquids with ozone.

The present invention generally relates to the field of water purification and treatment of flowable hazardous waste. Recent developments in water purification and treatment require ozone ($O_3$) to be diffused into the liquid as part of the treatment process to destroy contaminants. There have long been various methods and devices for the treatment of biological and chemical contaminants in waste fluids. Large-scale water treatment facilities have been traditionally used for the treatment, removal, and processing of both human and low levels of industrial waste. With increased urbanization, these same water treatment facilities have been required to additionally treat complex mixtures of toxic and hazardous material from both private and industrial users. As a result, many of these same water treatment facilities are now unable to adequately treat the increased waste flow resulting in accidental or deliberate discharge of untreated material directly into the environment.

To combat the increased flow and more complex nature of current waste fluids, many wastewater utilities throughout the country require industrial generators of organic wastes high in biochemical oxygen demand (food waste, fats and oils, etc.,), recalcitrant xenobiotics (synthetic organic compounds foreign natural biological systems), heavy metals (Cd, Hg, Pb, etc.) and/or highly acid or alkaline pH to pre-treat their waste stream on-site prior to delivery to a waste water treatment facility. Although pre-treatment is required of many industries, liquid wastes generated by hospitals, medical facilities, medical examiners offices, healthcare offices, research facilities, nursing homes, food processing and animal handling facilities, diagnostic laboratories, veterinary clinics, analytical, chemical, microbiological, biotechnology and university laboratories in many instances are not required to pre-treat their collective wastewater stream even though this waste material is known to contain a variety of toxicogenic/mutagenic/teragenic/carcinogenic chemicals and viable, infectious, or genetically altered microbial pathogens. Many of the current pre-treatment units presently in use are expensive to operate, require trained personnel to maintain and require the use of caustic and/or toxic chemicals or expendable filters and cartridges which must be disposed of as a hazardous substance.

Ozone has been used for more than sixty years for water treatment on the European continent. The role of ozone in waste fluid treatment may be classified as both an oxidant and a germicidal compound. There are at least four distinct recognized applications of ozone: (1) as a bactericide; (2) as a viricide; (3) as a powerful chemical oxidant; and (4) as a promoter of hydroxyl radicals when combined with ultraviolet radiation. The potent germicidal properties of ozone have been attributed to its high oxidation potential. Research indicates that disinfection by ozone is a direct result of bacterial cell wall disintegration. This is known as the "lysis phenomenon".

Ozone has several attributes in the treatment of waste fluids such as odor control, color removal, and iron and manganese removal. Ozone oxidizes inorganic substances completely and rapidly, e.g., sulfides to sulfates, and nitrites to nitrates. Of even greater importance is ozone's capability of breaking down complex organic chemicals. Oxidation of organic materials is more selective and incomplete at the concentrations and pH values of aqueous ozonation. Unsaturated and aromatic compounds are oxidized and split at the classical double bonds, producing carboxylic acids and ketones as products. Ozone also exerts a powerful and bleaching action on organic chemicals, which contribute to the color removal in waste fluids.

Many of the treatment systems employing ozone are limited in their commercial application due to their relatively small scale and ability to deliver an adequate concentration of ozone sufficient for bacterial inactivation and chemical destruction. Typically these combined treatment systems have only been utilized for "in-home" domestic potable water treatment to remove taste and odor problems resulting from chlorination. As a result there has been considerable interest in improving ozone treatment systems and techniques to allow for the treatment of more complex waste fluids at higher flow rates, maximum efficiency and at minimal cost.

When treating a liquid, such as drinking water or contaminated water, by diffusing a gas, such as ozone, it has been recognized that the greater the area of interface between the water and the gas, the greater the amount of gas that will be dissolved into the liquid. Therefore, the goal is to put as many very fine gas bubbles into the liquid as is feasible. It has also been recognized that the amount of gas diffused into the liquid is in direct proportion that the time the bubble liquid interface is maintained. Therefore, an additional goal is then to keep the gas bubbles in the liquid being treated as long as possible before the bubbles reach the top of the reactor vessel (gas holdup). It has also been recognized that the dissolution occurs more efficiently if the bubbles move through the liquid rather than remaining relatively stationary in the liquid. This maintains the greatest concentration gradient at the gas-liquid interface. Therefore, an additional goal is then to have the gas bubbles move through the liquid over time.

Existing methods for establishing and maintaining the gas-liquid contact include a simple porous plate, punctured membranes, fans and turbines, to complicated motive jets mounted in reaction vessels to mix the gas and liquid. U.S. Pat. No. 5,720,905—Ho discloses a porous plate with openings between 0.2–2 mm to produce bubbles in liquid in a reaction vessel. Ho does not establish any means to reduce the size of the bubbles or increase the gas-liquid contact time. In Ho, the bubbles simply float directly to the surface of the liquid in the reaction vessel. U.S. Pat. No. 4,581,137—Edwards, uses a flexible membrane with plurality of minute punctures to discharge the gas in fine bubbles. U.S. Pat No.s 5,399,261—Martin, and U.S. Pat. No. 4,072,613—Alig, both disclose a mechanical stirrer blade mounted in the reaction vessel to breakup the gas bubbles to speed the dissolution of ozone into the liquid. U.S. Pat. No. 5,314,076—La Place, discloses turbines mounted in the reaction vessel to mix the gas bubbles in the liquid. The mechanical devices all require the expense of manufacturing the fans or turbines, increase the complexity of the system, and increase maintenance requirements by immersing mechanical devices in the liquid be treated.

U.S. Pat. No. s 6,139,755—Marte, and 4,162,970—Zlokarnik, both use complex nozzles to mix the gas and liquid. Marte discloses at least one jet nozzle to mix the gas and liquid, and produce an unstationary flow and cavitational flow to dissolve the gas. Zlokamik uses a single nozzle to disburse the gas into very fine bubbles, but no rotational flow is induced in the reaction vessel to increase the gas-liquid contact time and to move the gas bubbles through the liquid.

For the foregoing reasons, there is a need for a simple, efficient, non-mechanical apparatus, inexpensive to make and maintain, to enhance and control the amount of gas diffused in the liquid being treated.

BRIEF SUMMARY OF THE INVENTION

The present invention is directed to an apparatus and method that satisfies the need described in the Background section. The object of the invention is to provide an apparatus and process for establishing and maintaining efficient and economical fluid-liquid contact. Efficient mass transfer or transport of a fluid into solution with a liquid is a function of the volume to surface area ratio of the bubbles, the contact time between the bubbles and the liquid, and the density gradient at the fluid-liquid boundary layer. The present invention can be used in a water purification system or hazardous waste treatment system. The present invention economically and simply provides maximum dissolution of a gas using readily available, low maintenance, and economical parts, and is compatible with existing systems.

The uses for the invention include establishing and maintaining contact between any type of fluid and a liquid. The fluid ejected through the apparatus into the reaction vessel includes liquids as well as gas. Use of the word "gas" in theses specifications and the claims represents all fluids, and does not limit the invention or the claims to only fluids in a gaseous state.

The invention involves an apparatus with nozzles that can be easily adjusted in size and orientation to optimize the gas-liquid contact time. The apparatus contains several nozzles or jets that cause very fine bubbles of the gas (or gas-liquid mixture) to be ejected into a reaction vessel. One or more nozzles are mounted at appropriate angles to direct the gas (or gas-liquid mixture) against the reaction vessel walls to further breakup the very fine bubbles. One or more nozzles are directed to discharge the gas (or gas-liquid mixture) such that the discharge moves rotationally around the vertical axis of the reaction vessel, thus inducing the gas bubbles and the liquid being treated to rotate around the vertical axis. The gas being drawn off at the top, and the liquid being drawn off at the bottom. Treatment efficiency is increased by maximizing contact time and increasing gas dissolution. The apparatus is mounted on a pipe or similar conduit in the reaction vessel. The pipe serves to deliver the gas (or gas-liquid mixture) to the apparatus and as a mount for the apparatus to locate it appropriately in the reaction vessel. The apparatus and the reaction vessel are incorporated into a system that includes a source for the gas, a recovery method for undissolved gas, a method for circulating the fluid to be treated, and a method for recovering the fluid after treatment. The system can also include a differential pressure injector, such as a Mazzei injector (Mazzei Injector Corp., U.S. Pat. No. 5,863,128) located outside the reaction vessel to pre-mix the gas and a portion of the fluid to be treated prior to ejecting through the apparatus into the reaction vessel.

As used herein, "very fine bubbles" means bubble diameters less than 1 mm and the nozzle diameter, typically 6.75 mm. Very fine bubbles are preferably between 0.01 mm and 1.0 mm, and optimally between 0.01 and 0.10 mm. For increasing the contact efficiency, the smaller the bubble, the better. For example:

Bubble #1
    Size (diameter) =1.0 mm
    Volume =0.524 $mm^3$
    Surface Area =3.143 $mm^2$ Bubble #2
    Size (diameter) =0.1 mm
    Volume =0.000524 $mm^3$
    Surface Area =0.03143 $mm^2$ One thousand small bubbles (0.1 mm) can be made from the large bubble (1.0 mm). The small bubbles would have a total surface area of 31.43 $mm^2$. This is 10 times the surface area of the 1.0 mm bubble. The small bubbles (0.1 mm) can theoretically ozonate 10 times as much water with the same amount of ozone, or theoretically introduce 10 times the ozone concentration into the same volume of water, i.e., given constant water characteristics, contact time and ozone solubility limits.

The invention also includes the process for dissolving a gas into a liquid by using fixed nozzles immersed in a reaction vessel to create very fine bubbles and rotational movement of the gas (or gas-liquid mixture).

An advantage of the invention described herein includes the use and arrangement of one or mores nozzles to produce rotational, noncavitational flow without using any mechanical device. The invention described herein also can be easily and economically adjusted to achieve a desired bubble size and contact time. These adjustments include but are not limited to changing the number, orientation, and size of the nozzles, by changing the gas pressure, by premixing the gas and the liquid before ejection from the nozzles, by changing the rate the liquid is withdrawn from the system.

The present invention relates to a process of and apparatus for treating dangerous biological waste, waste chemicals and other flowable waste to eliminate or render harmless, or inert, organic waste materials such as diseased human blood, cells and tissue, residual solvents used in cleaning human cells and tissue, and microorganisms for safe, charge neutralized and harmless release into conventional utility sewer systems, septic tanks and holding tanks, while meeting environmental standards established for these specific materials. This process and apparatus aid the user in achieving compliance with environmental statutes and regulations with maximum efficiency and at minimal cost.

These and other features, aspects, and advantages of the present invention will become better understood with reference to the following description, accompanying drawings, and appended claims.

BRIEF DESCRIPTION OF THE DRAWINGS

The features, aspects, and advantages of the invention will become better understood from the following description of preferred embodiments of the invention, presented by way of a non-restrictive illustration, from the appended drawings, of which.

BEST MODE OF CARRYING OUT THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the invention in virtually any appropriate structure or process.

Reference is now made to the drawings, wherein like characteristics and features of the invention shown in the various Figures are designated by the same reference numbers.

Figure 1:
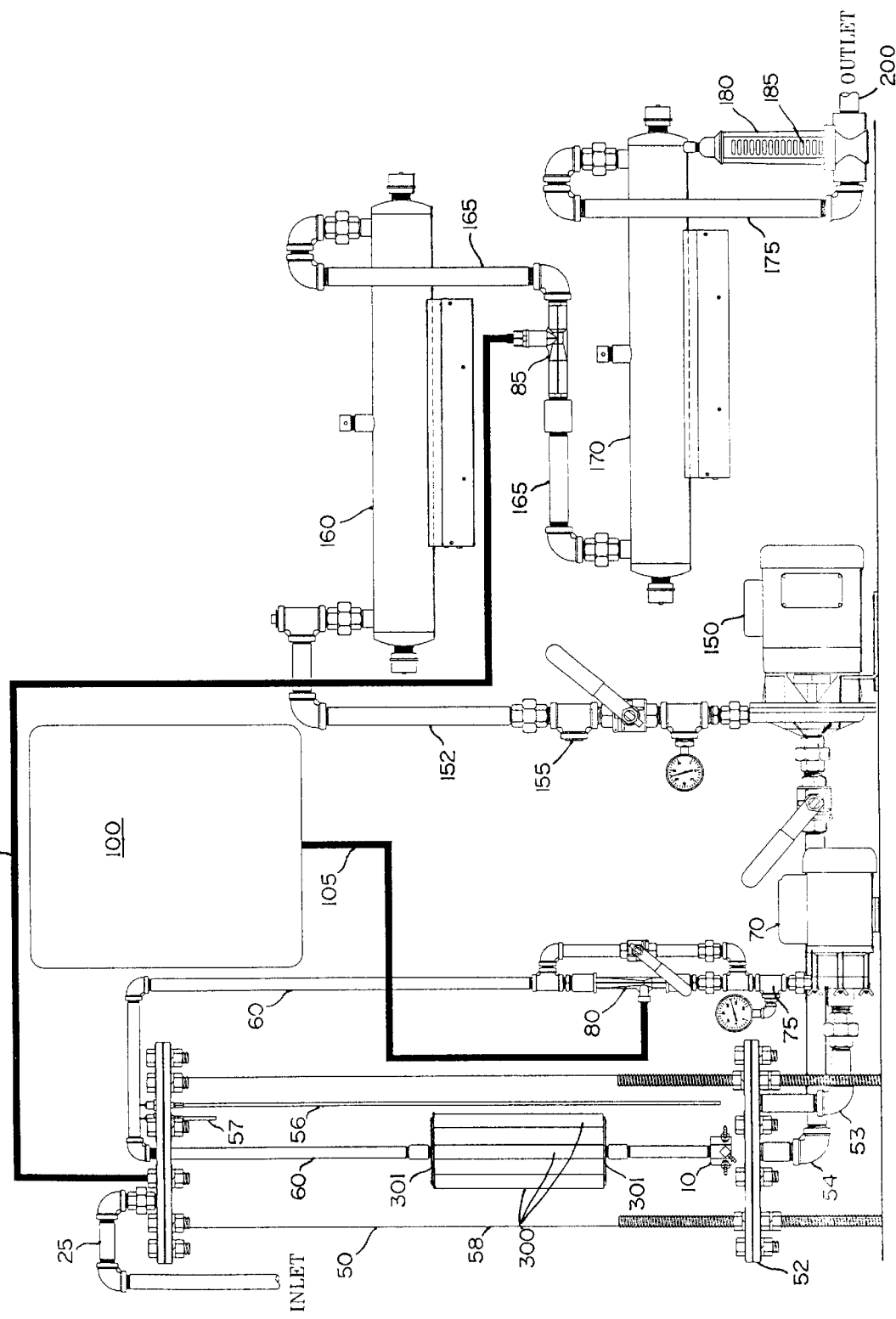
FIG. 1 is a configuration showing use of the gas-liquid distributor in a system and process for dissolving ozone in contaminated liquids or water to be purified.

FIG. 1 shows the gas liquid contact apparatus incorporated into a system for dissolving ozone gas into contaminated liquids or water for purification.

Aqueous contaminated liquid or water to be purified is received through a system inlet pipe or other conduit 25 and passes through the reaction vessel lid 51 into the reaction vessel 50. When the level of waste liquid reaches a sufficient level to contact a first conductivity sensor 56, a relay is activated that starts both the recirculation pump 70 and the ozone generator 100. Waste liquid is drawn from the bottom of the reaction vessel 52 through a pipe or similar conduit 53 into the recirculation pump 70. The recirculation pump 70 then forces the liquid through a pipe or similar conduit 75 through a first differential pressure injector 80, such as a Mazzei injector (Mazzei Injector Corp., U.S. Pat. No. 5,863,128). The vacuum end of the first Mazzei injector 80 draws ozone from the ozone generator 100 through a pipe or similar conduit 105 into the waste liquid passing through the first Mazzei Injector 80.

The liquid-ozone mixture is then pumped through the recirculation inlet pipe or similar conduit 60 past the reaction vessel lid 51 and into the gas-liquid distributor 10. The gas-liquid distributor 10 is mounted to said recirculation inlet pipe 60 pipe, suspended about two inches above the reaction vessel floor 52 so that the impact of the gas (or gas-liquid mixture) breaks the gas into micro-fine bubbles.

Exhaust gas from the reaction vessel 50 is vented through vent tube 110 to a subsequent stage described below.

The liquid-ozone mixture level in the reaction vessel 50 continues to rise until it closes the second conductivity level switch 57. Upon closure of this switch, a process pump 150 draws liquid-ozone mixture from the bottom of the reaction vessel 52 through a pipe or similar conduit 54. The process pump 150 pushes the liquid-ozone mixture through a process pipe or similar conduit 152 and check valve 155 to the first U-V treatment unit 160. The liquid-ozone mixture then travels through a U-V unit connecting pipe or conduit 165, connecting the first U-V treatment unit 160 to a second U-V treatment unit 170. A second Mazzei injector 85 is placed in said U-V unit connecting pipe or conduit 165 so that the fluid flows through it. The vacuum end of said second Mazzei injector 85 is connected to the ozone vent tube 110. The ozone vent tube 110 recovers any unreacted ozone that had bubbled through the fluid in the reaction vessel 50. The second Mazzei injector 85 vacuums the recovered ozone into the fluid flowing through the U-V unit connecting pipe or conduit 165. At this point in the process, all of the ozone has been consumed by reaction with the contaminants in the fluid being treated and/or decomposed forming hydroxyl radicals when exposed to the U-V radiation.

The fluid being treated then flows through a second U-V treatment unit 170 through a connecting pipe or conduit 172 to a VU-Flow Canister 180. The VU-Flow Canister contains a solid cylindrical bar of zinc 185 used as a sacrificial anode and eliminates any static charge that may have accumulated in the fluid being treated. The fluid exits the treatment process by the outlet 200.

Figure 2:
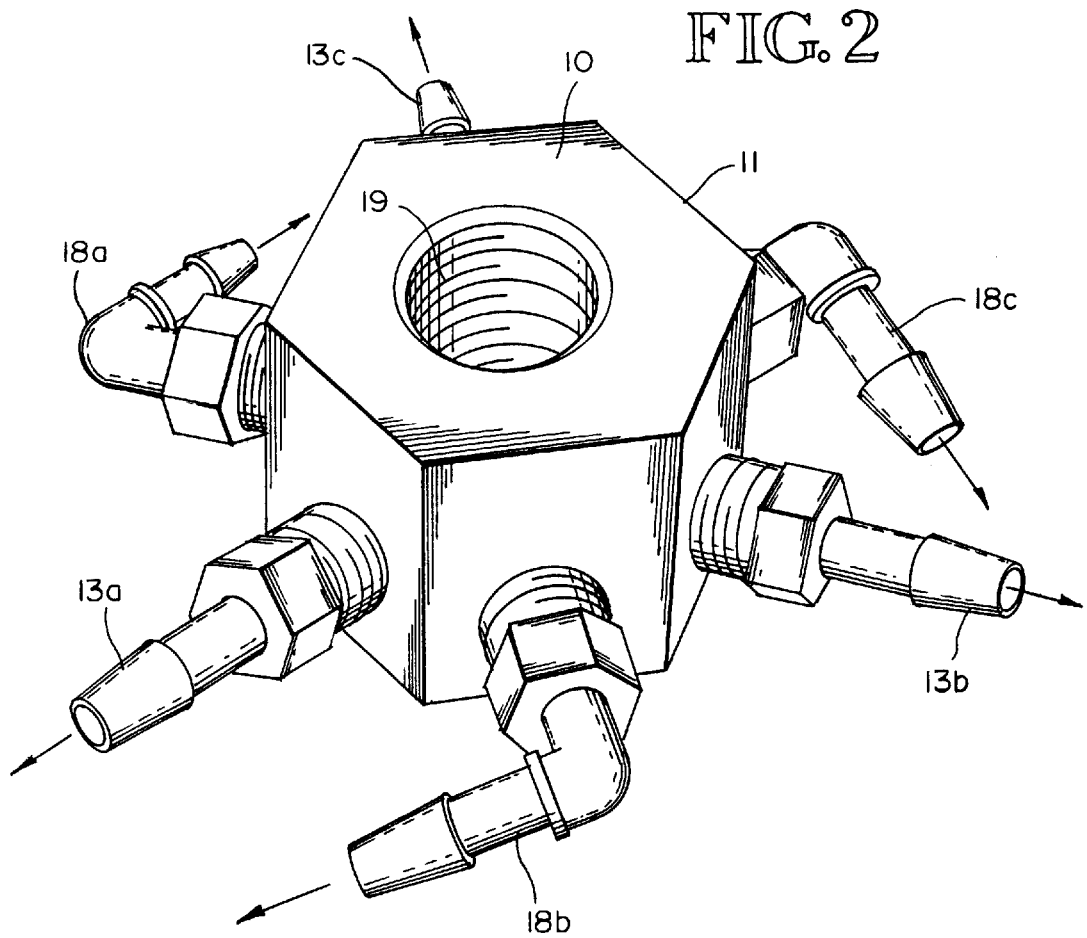
FIG. 2 is the preferred embodiment of the gas-liquid distributor. The nozzles are orientated to discharge at different angles to produce mixing and rotational flow of the very fine bubbles.

FIG. 2 illustrates one preferred embodiment of the gas-liquid distributor 10. A manifold 11 is sized to accommodate the inlet pipe 60, the desired flow rate, mounting the apparatus 10 to the inlet pipe 60, and to support nozzles 13a–c and 18a–c. In this preferred embodiment, the six outlet nozzles 13a–c and 18a–c are mounted on the perimeter of the apparatus 10. The three nozzles mounted on 90-degree elbows 18a–c are angled down toward the reaction vessel floor 52 causing the fluid and the ozone gas bubbles to rotate in the reaction vessel 50. The other three nozzles 13a–c are mounted to discharge perpendicular to the vertical axis of the reaction vessel 50. The discharge angle of nozzles 13a–c and 18a–c may be altered to modify the performance of the apparatus 10.

In a first alternative embodiment, depending on the nature of the contaminants involved, the treated liquid exiting the system at the outlet 200 is connected to the inlet 25 to be retreated. The connection can be by pipe or similar conduit. The recirculation can be repeated several times until the desired level of treatment is obtained.

In a second alternative embodiment, the ozone generator 100 is connected directly to the inlet pipe 60 by connecting pipe or tube 106. Only ozone is discharged from the gas-liquid distributor 10 into the reaction vessel 50. The liquid being treated is recirculated through the reaction vessel using the recirculation pump 70 and recirculation outlet 53, but the recirculated liquid enters the reaction vessel through an additional inlet pipe or similar conduit. In this alternative embodiment, the liquid being treated is not pre-mixed with ozone at the first Mazzei injector.

Figure 3:
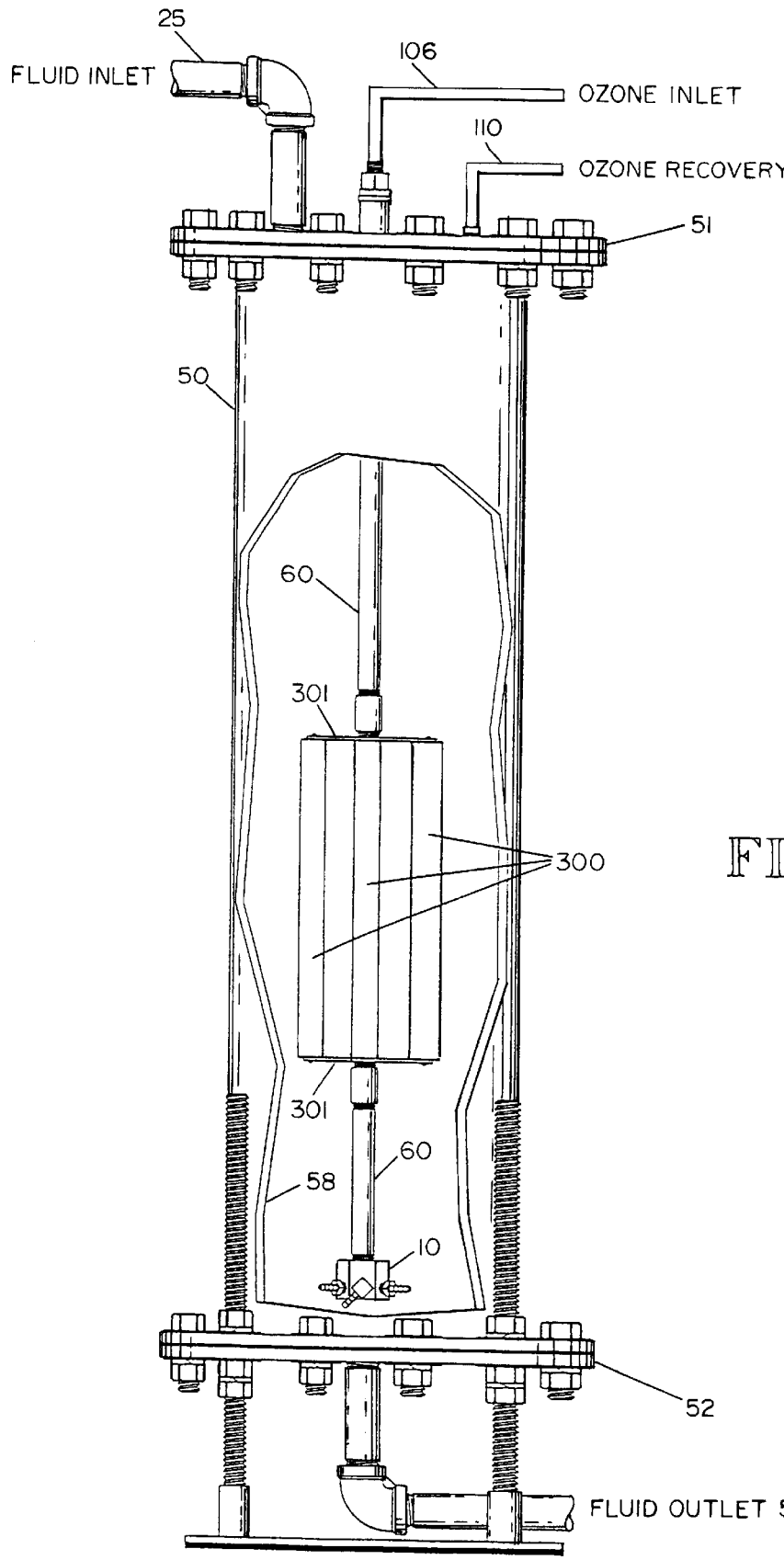
FIG. 3 is a detailed depiction of the preferred embodiment of the gas-liquid distributor mounted in the reaction vessel.

FIG. 3 illustrates an alternative embodiment of the reaction vessel 50 where the ozone generator 100 is connected directly to the inlet pipe 60 by connecting pipe or tube 106. Only ozone is discharged from the gas-liquid distributor 10 into the reaction vessel 50. Brackets 301 are mounted on the portion of the inlet pipe 60 within the reaction vessel 50 at approximately the midpoint of the inlet pipe 60. The brackets 301 support three cylindrical magnets 300 that emit approximately 10,000 Gauss un-polarized linear magnetic fields. The liquid being treated is recirculated through the reaction vessel using the recirculation pump 70 and recirculation outlet 53, but the recirculated liquid enters the reaction vessel through an additional inlet pipe or similar conduit. In this alternative embodiment, the liquid being treated is not pre-mixed with ozone at the first Mazzei injector.

The orientation of both the straight nozzles 13a–c and the 90 degree nozzles 18a–c, and the impact of the bubbles against the reaction vessel bottom 52 and reaction vessel side 58, results in the formation of micro-fine gas bubbles and rotational movement of the bubbles and the liquid. These micro-fine bubbles remain in solution for an extended period of time due to the rotation imparted to the liquid-ozone mixture in the reaction vessel 50 by the 90-degree nozzles 18a–c. These features, micro-fine ozone bubbles, extended bubble contact time with the fluid, and movement of the bubbles through the liquid, result in a high mass transfer of ozone from the gas phase to the aqueous phase. Dissolving high concentrations of ozone in solution is required for reaction with organic contaminants and microorganisms.

The apparatus and system eliminate the need for a mechanical stirring to enhance the gas liquid contact.

EXAMPLE

An example of the invention was built and tested using the gas-liquid distributor. The system configuration was approximately as shown in FIG. 1, and the gas-liquid distributor configuration was approximately as shown in Figure. 2. The uses of this system range from treating drinking water to treating contaminated liquids. The reaction vessel was approximately 1.2 meters tall and 0.25 meters in diameter. Six nozzles were used in the gas-liquid distributor with the nozzle diameter being approximately 6.75 mm. The three nozzles comprising the second fraction were orientated to discharge at approximately 30 degrees below horizontal. The reaction vessel and the system was filled with 45 liters water to be purified. In operational trial number one, the recirculation pump 70 was not operated. Ozone was pumped from the generator 100 into the gas-liquid distributor at a rate of 8 grams per hour at a pressure of approximately 5 pounds per square inch and flow rate of approximately 3 liters per minute. The ozone as then ejected through the gas-liquid distributor 10 into the water contained in the reaction vessel. Without the aid of the recirculation pump, the resulting bubbles were between 0.5 mm and 1.0 mm. The bubbles had a vertical velocity of approximately 0.1 meters per second. The rotational velocity of the water in the reaction vessel was approximately 0.25 meters per second. After approximately 2 minutes, the resulting ozone concentration measured at the bottom of the water column was less than 1 mg/L or a mass transfer efficiency of <16.9%. Without the recirculation pump in operation, the ozone concentration after two minutes of operation is relatively low. The pressure and ozone flow rate is much too low for efficient mass transfer, and does not promote vigorous rotational mixing in the reaction vessel. After ten minutes of operation in this configuration, the ozone concentration yielded mass transfer efficiencies in the high 90% area, thus slowly achieving saturation. Once the system was shut down it took approximately 1 minute for the water column to become clear and bubble free.

When the recirculation pump 70 is in operation, the same system achieves almost immediate ozone saturation. Ozone is introduced into the water stream through a Mazzei injector via use of the recirculation pump. The recirculation pump operated at a flow rate of 30 liters per minute, and results in positive head pressure at the gas-liquid distributor of approximately 10 pounds per square inch. This produced a vigorous rotational mixing in the reaction vessel and induced bubble breakage against the vessel wall. The resulting ozone/water mixture was ejected through the gas-liquid distributor at a velocity of approximately 1.5 meters per second. The resulting bubbles were between 0.01 and 0.1 mm. The bubbles had a vertical velocity of approximately 0.02 meters per second. The rotational velocity of the water in the reaction vessel was approximately 1 meter per second. The result on the water was that after approximately 2 minutes the resulting ozone concentration measured at the bottom of the water column was greater than 5.3 mg/L or a mass transfer efficiency in excess of 90%. Once the system was shut down it took approximately 10 minutes for the water column to become clear and bubble free.

These two examples demonstrate the effectiveness of the gas distributor, when used in conjunction with the recirculating pump, at achieving the three main goals of the device:

a. increased interface area between the ozone and liquid (i.e., by smaller bubble size);

b. increased contact time of the bubbles and water column (i.e., by slower vertical velocity of the bubbles in the water column), and;

c. increased movement of the bubbles through the liquid over time (i.e., by increased velocity through the ejector nozzles, which results in increased rotational velocity and increased time required for the water column to become bubble free).

These, and other modifications to the preferred embodiment would be obvious to one of ordinary skill. Therefore, it is intended that the foregoing detailed description be regarded as illustrative, rather than limiting, and that it be understood that it is the following claims, including all equivalents, which are intended to define the protected scope of this invention.

INDUSTRIAL APPLICABILITY

The apparatus and process are used to treat hazardous or contaminated liquids with ozone. Dissolving ozone gas into hazardous or contaminated liquids increases the decomposition of aqueous-based organic compounds, precipitation of selected heavy metals, and improves the destruction and/or deactivation of enteric viruses, enteric bacteria, and protozoans. The process using the apparatus treats chemical and biological contaminants more efficiently and economically than existing methods, and reduces the formation of undesired reaction by-products and greater microorganism kills.

What is claimed is:

1. An apparatus for increasing contact efficiency between a gas and a liquid, the apparatus comprising:

a. a reaction vessel having a top, a bottom, and one or more sides;

b. one or more inlets for fluid being treated in said reaction vessel;

c. one or more outlets for fluid being treated in said reaction vessel;

d. an outlet for gas to be recovered from said reaction vessel;

e. a gas (or gas-liquid mixture) inlet pipe or tube suitable for carrying the gas (or gas-liquid mixture), attached at its first end to one of the inlets of the reaction vessel; and f. a gas-liquid distributor attached to the second end of the gas (or gas-liquid mixture) inlet pipe or tube, the gas-liquid distributor comprising;

i a manifold for receiving receiving a gas (or gas-liquid mixture); and ii a plurality of nozzles attached to the manifold, said nozzles being sized to form very fine bubbles;

wherein the contact efficiency between the gas and the liquid is enhanced.

2. The apparatus of claim 1, where a first fraction of the nozzles are orientated to discharge perpendicular to the vertical axis of the reaction vessel.

3. The apparatus of claim 1, where the gas-liquid distributor is mounted above the floor of the reaction vessel.

4. The apparatus of claim 1, comprising in addition a differential pressure injector to premix the gas and liquid prior to introduction into the gas-liquid distributor.

5. The apparatus of claim 1, where the apparatus is suitable for use with ozone.

6. The apparatus of claim 1, comprising in addition a means for capturing the undissolved gas and recirculating it back through the gas-liquid distributor.

7. apparatus for increasing contact efficiency between a gas and a liquid, the apparatus comprising:
   a. a reaction vessel having a top, a bottom, and one or more sides;
   b. one or more inlets for fluid being treated in said reaction vessel;
   c. one or more outlets for fluid being treated in said reaction vessel;
   d. an outlet for gas to be recovered from said reaction vessel;
   e. a gas (or gas-liquid mixture) inlet pipe or tube suitable for carrying the gas (or gas-liquid mixture), attached at its first end to one of the inlets of the reaction vessel; and
   f. a gas-liquid distributor attached to the second end of the gas (or gas-liquid mixture) inlet pipe or tube, the gas-liquid distributor comprising;
      i a manifold for receiving receiving a gas (or gas-liquid mixture); and
      ii a plurality of nozzles attached to the manifold, said nozzles being sized to form very fine bubbles, wherein a first fraction of the nozzles is orientated to discharge perpendicular to the vertical axis of the reaction vessel; and a second fraction of the nozzles is orientated to discharge approximately perpendicular to a radial from the vertical axis of the reaction vessel to create rotational flow of the gas-liquid mixture in the reaction vessel.

8. The apparatus of claim 7 where the first fraction of nozzles is orientated to impact the gas (or gas-liquid mixture) discharge against the side of the reaction vessel such that the bubbles are further broken in to very fine bubbles.

9. The apparatus of claim 7 where the gas-liquid distributor is mounted above the floor of the reaction vessel.

10. The apparatus of claim 7, comprising in addition a differential pressure injector to premix the gas and a portion of the liquid prior to introduction into the gas-liquid distributor.

11. The apparatus of claim 7, wherein the apparatus is suitable for use with ozone.

12. The apparatus of claim 7, further comprising a means for capturing the undissolved gas and recirculating it back through the gas-liquid distributor.

13. A gas-liquid distributor for increasing contact efficiency between a gas and a liquid contained in a reaction vessel, the gas-liquid distributor comprising:
   a. a surface suitable for mounting the distributor in the reaction vessel;
   b. a manifold for receiving receiving a gas (or gas-liquid mixture); and
   c. a plurality of nozzles attached to the manifold, said nozzles being sized to form very fine bubbles, wherein a first fraction of the nozzles is orientated to discharge perpendicular to the vertical axis of the reaction vessel; and a second fraction of the nozzles is orientated to discharge approximately perpendicular to a radial from the vertical axis of the reaction vessel to create rotational flow of the gas-liquid mixture in the reaction vessel.

14. The gas-liquid distributor in claim 13, wherein a fraction of nozzles is orientated to impact the gas (or gas-liquid mixture) discharge against the side of the reaction vessel such that the bubbles are further broken in to very fine bubbles.

15. The gas-liquid distributor in claim 13, comprising in addition a differential pressure injector to pre-mix the gas and liquid prior to introduction into the gas-liquid distributor.

16. The gas-liquid distributor in claim 13, where the apparatus is suitable for use with ozone.

17. The gas-liquid distributor in claim 13, comprising in addition a means for capturing the undissolved gas and recirculating it back through the gas-liquid distributor.

18. The gas-liquid distributor in claim 13, where the gas-liquid distributor is mounted above the floor of the reaction vessel.

19. A process for dissolving gas in a liquid for the purification or treatment of the liquid, the process comprising the steps of:
   a. Mounting a gas-liquid distributor in a reaction vessel, the gas-liquid distributor comprising;
      i a manifold for receiving receiving a gas (or gas-liquid mixture);
      ii a plurality of nozzles attached to the manifold; said nozzles being sized to form very fine bubbles, a first fraction of the nozzles orientated to discharge perpendicular to the vertical axis of the reaction vessel, and a second fraction of the nozzles orientated to discharge approximately perpendicular to a radial from the vertical axis of the reaction vessel to create rotational flow of the gas-liquid mixture in the reaction vessel;
   b. placing the liquid to be purified or treated in the reaction vessel;
   c. ejecting the gas through the gas-liquid distributor into the liquid contained in the reaction vessel to induce spiral movement of said liquid to enhance the gas-liquid contact;
   d. venting the undissolved gas from the reaction vessel; and
   e. withdrawing the liquid from the reaction vessel as partially or wholly purified or treated liquid.

20. The gas-liquid distributor in claim 19, wherein a fraction of nozzles is orientated to impact the gas (or gas-liquid mixture) discharge against the side of the reaction vessel such that the bubbles are further broken in to very fine bubbles.

21. The process in claim 19, wherein the gas to be dissolved and a portion of the liquid are pre-mixed prior to delivery to the gas-liquid distributor.

22. The process in claim 19, wherein the liquid enters the reaction vessel at the top and is withdrawn from the bottom of the reaction vessel.

23. The process in claim 19, wherein the undissolved gas from the reaction vessel is captured and recirculated back through the gas-liquid distributor.

24. The process in claim 19, wherein the liquid flows through the reaction vessel approximately horizontally.

25. The process in claim 19, wherein the withdrawn liquid is returned to the reaction vessel for further treatment.

26. The process in claim 19, wherein the withdrawn liquid is further treated with ultraviolet radiation.

27. The process in claim 26, wherein the withdrawn liquid is returned to the reaction vessel for further treatment.

28. The process in claim 19, wherein the process operates continuously.

29. The process in claim 19, wherein the process operates in batches.

* * * * *